US011934559B2

(12) United States Patent
Weerasinghe et al.

(10) Patent No.: US 11,934,559 B2
(45) Date of Patent: Mar. 19, 2024

(54) COORDINATED PRIVACY FOR TARGETED COMMUNICATIONS AND REPORTING

(71) Applicant: Charter Communications Operating, LLC, St. Louis, MO (US)

(72) Inventors: Srilal M. Weerasinghe, Parker, CO (US); Vipul Patel, Great Falls, VA (US); Gabe Zimbelman, Arvada, CO (US); Duncan Gold, Denver, CO (US)

(73) Assignee: Charter Communications Operating, LLC, St. Louis, MO (US)

( * ) Notice: Subject to any disclaimer, the term of this patent is extended or adjusted under 35 U.S.C. 154(b) by 77 days.

(21) Appl. No.: 17/313,344

(22) Filed: May 6, 2021

(65) Prior Publication Data

US 2022/0358245 A1 Nov. 10, 2022

(51) Int. Cl.
*G06F 21/62* (2013.01)
*H04L 9/40* (2022.01)

(52) U.S. Cl.
CPC ...... *G06F 21/6254* (2013.01); *H04L 63/1491* (2013.01)

(58) Field of Classification Search
CPC ................ G06F 21/6254; H04L 63/1491
See application file for complete search history.

(56) References Cited

U.S. PATENT DOCUMENTS 10,430,830 B2 * 10/2019 Glover ............... G06Q 30/0248
10,447,682 B1 * 10/2019 Du Lac ................. H04L 9/3247
11,075,931 B1 * 7/2021 Warren ............... H04L 63/1416
2010/0322425 A1 * 12/2010 Park ..................... H04L 63/0428
380/270
2016/0092699 A1 * 3/2016 Riva .................... H04L 63/0421
726/26

(Continued)

OTHER PUBLICATIONS

Author Uknown, "2020 Census Data Products: Disclosure Avoidance Modernization," United States Census Bureau, Jul. 22, 2020, https://www.census.gov/about/policies/privacy/statistical_safeguards/disclosure-avoidance-2020-census.html, 5 pages.

(Continued)

*Primary Examiner* — Carl G Colin
*Assistant Examiner* — Andrew Suh
(74) *Attorney, Agent, or Firm* — Dority & Manning, P.A.

(57) ABSTRACT

Disclosed herein are embodiments providing coordinated privacy for targeted communications and reporting. In particular, the embodiments provide a source user querying an information system to generally identify target users for a communication campaign. A privacy controller alters a first dataset of a query response by a first alteration quantity for transmission to the source user. The source user then generally identifies target users within the first dataset for development of a communication campaign of targeted communications directed to the target users. Subsequently, a reporting system generates a report with a second dataset detailing viewership by target users. The privacy controller alters a second dataset of a report by a second alteration quantity for transmission to the source user. The second alteration quantity is based on the first alteration quantity. Accordingly, for targeted communication campaigns, the privacy controller maintains individual privacy while also providing accurate reporting.

19 Claims, 12 Drawing Sheets

(56) References Cited

U.S. PATENT DOCUMENTS

| | | | |
|---|---|---|---|
| 2017/0195346 A1* | 7/2017 | Be'ery | H04L 63/10 |
| 2018/0314853 A1* | 11/2018 | Oliner | G06F 21/6254 |
| 2021/0004478 A1* | 1/2021 | Narayanan | G06F 21/6236 |
| 2021/0089657 A1* | 3/2021 | Dunjic | G06F 21/60 |
| 2021/0281483 A1* | 9/2021 | Malpani | G06F 16/248 |
| 2021/0321256 A1* | 10/2021 | Falk | H04W 8/18 |

OTHER PUBLICATIONS

Author Unknown, "ANSI/SCTE 130-6 2020: Digital Program Insertion—Advertising Systems Interfaces Part 6—Subscriber Information Service (SIS)," American National Standard, Society of Cable Telecommunications Engineers, Inc., 103 pages.

Author Unknown, "Cookies crumbling as Google phases them out," BBC News, Jan. 15, 2020, https://www.bbc.com/news/technology-51106526, 11 pages.

Author Unknown, "Keeping Secrets: Anonymous Data Isn't Always Anonymous," Berkley School of Information, Mar. 15, 2014, https://ischoolonline.berkeley.edu/blog/anonymous-data/, 3 pages.

Chin, A. et al., "Differential Privacy as a Response to the Reidentification Threat: The Facebook Advertiser Case Study," North Carolina Law Review, vol. 90, No. 5—Social Networks and the Law, Article 6, Jun. 1, 2012, https://scholarship.law.unc.edu/cgi/viewcontent.cgi?article=4577&context=nclr, 41 pages.

De Montjoye et al., "Unique in the shopping mall: On the reidentifiability of credit card metadata," Science, vol. 347, Issue 6221, Jan. 30, 2015, https://science.sciencemag.org/content/347/6221/536, pp. 536-539.

Hern, A., "New York taxi details can be extracted from anonymised data, researchers say," The Guardian, Jun. 27, 2014, https://www.theguardian.com/technology/2014/jun/27/new-york-taxi-details-anonymised-data-researchers-warn, 5 pages.

Kumar, A. et al., "Query Monitoring and Analysis for Database Privacy—A Security Automata Model Approach," HHS Author Manuscript, PubMed Central (PMC), Mar. 17, 2016, NCBI, https://www.ncbi.nlm.nih.gov/pmc/articles/PMC4795904/, 16 pages.

Lindell, Y. et al., "A Practical Application of Differential Privacy to Personalized Online Advertising," IACR Cryptology ePrint Archive, 2011, https://www.semanticscholar.org/paper/A-Practical-Application-of-Differential-Privacy-to-Lindell-Omri/58fa1e12791ab8ba449c3ec0c592aa2798b54c71, 20 pages.

Mccullagh, D., "AOL's disturbing glimpse into users' lives," cnet, Aug. 9, 2006, https://www.cnet.com/news/aols-disturbing-glimpse-into-users-lives/, 9 pages.

Newman, L.H., "Google Wants to Help Tech Companies Know Less About You," Wired, Sep. 5, 2019, https://www.wired.com/story/google-differential-privacy-open-source/, 4 pages.

Schiff, A., "Why Every Ad Tech Company Must Understand Differential Privacy," Ad Exchanger, Feb. 24, 2020, https://www.adexchanger.com/privacy/why-every-ad-tech-company-must-understand-differential-privacy/, 8 pages.

Singel, R., "NetFlix Cancels Recommendation Contest after Privacy Lawsuit," Wired, Mar. 12, 2010, https://www.wired.com/2010/03/netflix-cancels-contest/, 3 pages.

Zibreg, C., "Differential privacy sees wider adoption since Apple first embraced it," iDownloadBlog, Jul. 7, 2017, https://www.idownloadblog.com/2017/07/07/apple-differential-privacy-web-browsing-health-data/, 6 pages.

\* cited by examiner

|    | ACTUAL DATA | POSSIBLE RESPONSES (WITH NOISE ADDED) | | |
|----|----|----|----|----|
| 1 | Y | Y | Y | N |
| 2 | Y | Y | N | Y |
| 3 | Y | Y | Y | Y |
| 4 | Y | N | N | Y |
| 5 | Y | Y | Y | Y |
| 6 | Y | Y | Y | Y |
| 7 | Y | N | Y | Y |
| 8 | N | Y | Y | Y |
| 9 | N | N | Y | N |
| 10 | N | N | N | Y |
| Total | 7Y / 3N | 6Y / 4N | 7Y / 3N | 8Y / 2N |
|    |    | 110(1) | 110(2) | 110(3) |

*FIG. 3*

| PATIENTID | PATIENT NAME | POSTCODE | AGE | DISEASE |
|---|---|---|---|---|
| 1 | ALICE | 47678 | 29 | HEART DISEASE |
| 2 | BOB | 47678 | 22 | HEART DISEASE |
| 3 | CAROLINE | 47678 | 27 | HEART DISEASE |
| 4 | DAVID | 47905 | 43 | FLU |
| 5 | ELEANOR | 47909 | 52 | HEART DISEASE |
| 6 | FRANK | 47906 | 47 | CANCER |
| 7 | GERI | 47605 | 30 | HEART DISEASE |
| 8 | HARRY | 47673 | 36 | CANCER |
| 9 | INGRID | 47607 | 32 | CANCER |

*FIG. 4A*

| PATIENT NAME | POSTCODE | AGE GROUP | DISEASE | |
|---|---|---|---|---|
| * | 476** | UNDER 30 | HEART DISEASE | ⎫ |
| * | 476** | UNDER 30 | HEART DISEASE | ⎬ 112(1) |
| * | 476** | UNDER 30 | HEART DISEASE | ⎭ |
| * | 479** | OVER 40 | FLU | ⎫ |
| * | 479** | OVER 40 | HEART DISEASE | ⎬ 112(2) |
| * | 479** | OVER 40 | CANCER | ⎭ |
| * | 476** | 30 TO 40 | HEART DISEASE | ⎫ |
| * | 476** | 30 TO 40 | CANCER | ⎬ 112(3) |
| * | 476** | 30 TO 40 | CANCER | ⎭ |

*FIG. 4B*

| PATIENT NAME | POSTCODE | AGEGROUP | DISEASE | |
|---|---|---|---|---|
| * | 476** | UNDER 30 | HEART DISEASE | ⎫ |
| * | 476** | UNDER 30 | HEART DISEASE | ⎬ 114(1) |
| * | 476** | UNDER 30 | FLU | |
| * | 476** | UNDER 30 | CANCER | ⎭ |
| * | 479** | OVER 40 | HEART DISEASE | ⎫ |
| * | 479** | OVER 40 | HEART DISEASE | ⎬ 114(2) |
| * | 479** | OVER 40 | FLU | |
| * | 479** | OVER 40 | PNEUMONIA | ⎭ |

*FIG. 5*

COORDINATED PRIVACY FOR TARGETED COMMUNICATIONS AND REPORTING

BACKGROUND

Targeted communications typically require general identification of target users and subsequent reports to users running a targeted communication campaign detailing results of communication campaigns reaching and engaging with the target users. Privacy systems are often employed to protect individual privacy of target users while providing aggregate information to source users. However, many such privacy systems are unable to adequately protect individual privacy while also providing accurate reporting.

SUMMARY

The embodiments disclosed herein provide coordinated privacy for targeted communications and reporting. In particular, the embodiments provide a source user querying an information system to generally identify target users for a communication campaign. A privacy controller alters a first dataset of a query response by a first alteration quantity for transmission to the source user. The source user then generally identifies target users within the first dataset for development of a communication campaign of targeted communications directed to the target users. Subsequently, a reporting system generates a report with a second dataset detailing viewership by target users. The privacy controller alters a second dataset of a report by a second alteration quantity for transmission to the source user. The second alteration quantity is based on the first alteration quantity. Accordingly, for targeted communication campaigns, the privacy controller maintains individual privacy while also providing accurate reporting.

In one embodiment, a method is provided. The method includes altering, by a computing device comprising a processor device and a memory, a first dataset of a query response by a first alteration quantity for transmission. The first alteration quantity is based on a size of the first dataset in the query response. The method further includes altering, by the computing device, a second dataset of a report by a second alteration quantity for transmission. The second alteration quantity is based on the first alteration quantity.

In another embodiment, a computer system is provided. The computer system includes a processor device set comprising one or more processor devices of one or more computing devices. The processor device set is configured to alter a first dataset of a query response by a first alteration quantity for transmission. The first alteration quantity is based on a size of the first dataset in the query response. The processor device set is further configured to alter a second dataset of a report by a second alteration quantity for transmission, the second alteration quantity based on the first alteration quantity.

Those skilled in the art will appreciate the scope of the disclosure and realize additional aspects thereof after reading the following detailed description of the embodiments in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

FIG. 3 is a chart illustrating a differential privacy generator of the privacy controller of FIG. 1;

FIG. 4A is a chart of data before applying a k-anonymity generator of the privacy controller of FIG. 1;

FIG. 4B is a chart illustrating a k-anonymity generator of the privacy controller of FIG. 1;

FIG. 5 is a chart illustrating an I-diversity generator of the privacy controller of FIG. 1;

DETAILED DESCRIPTION

Figure 1:
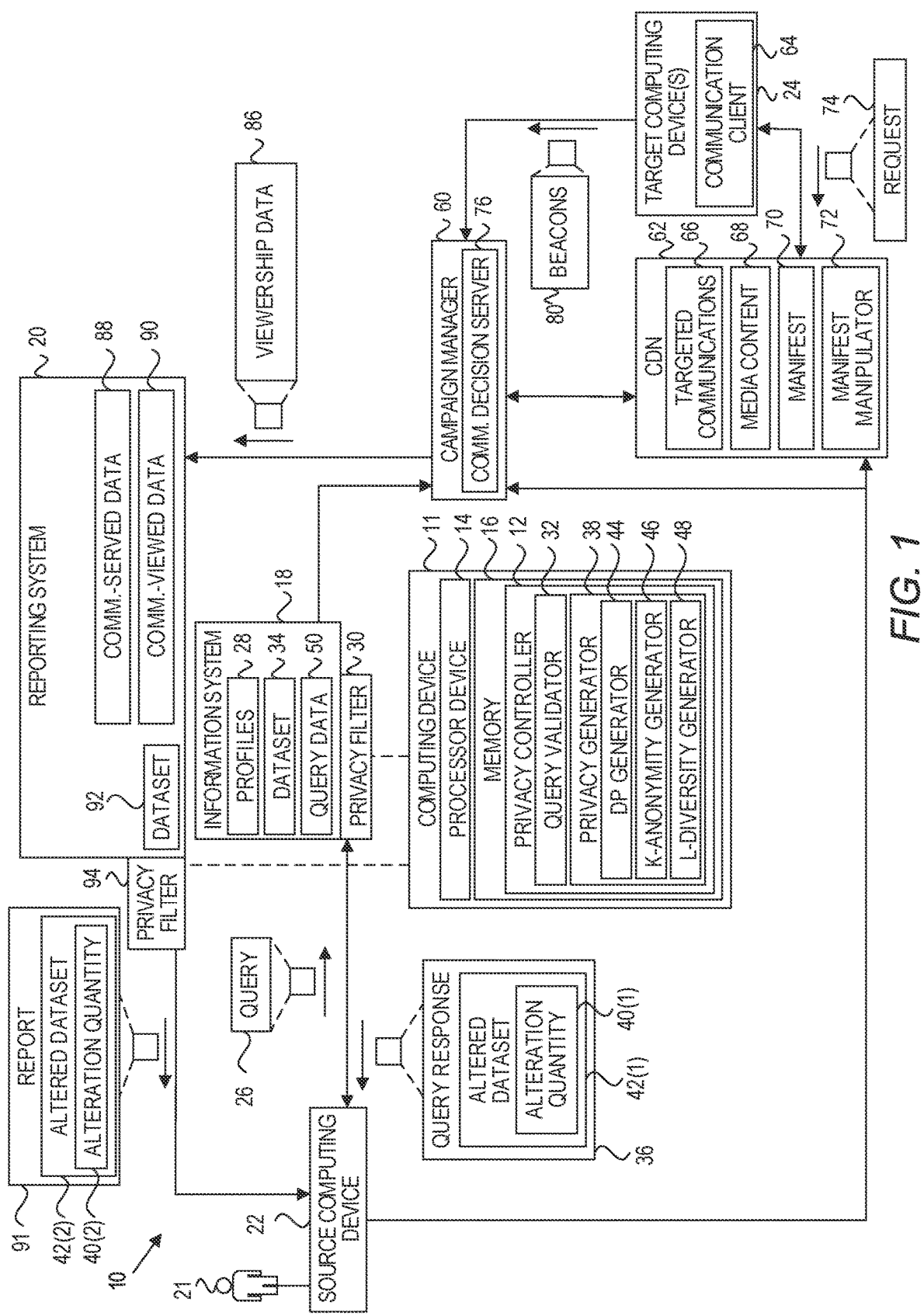
FIG. 1 is a block diagram of a system for coordinating privacy for targeted communications and reporting using a privacy controller, illustrating certain aspects of various embodiments disclosed herein.

The embodiments set forth below represent the information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the embodiments are not limited to any particular sequence of steps. The use herein of ordinals in conjunction with an element is solely for distinguishing what might otherwise be similar or identical labels, such as "first message" and "second message," and does not imply a priority, a type, an importance, or other attribute, unless otherwise stated herein. The term "about" used herein in conjunction with a numeric value means any value that is within a range of ten percent greater than or ten percent less than the numeric value.

As used herein and in the claims, the articles "a" and "an" in reference to an element refers to "one or more" of the element unless otherwise explicitly specified. The word "or" as used herein and in the claims is inclusive unless contextually impossible. As an example, the recitation of A or B means A, or B, or both A and B.

Targeted communications typically require general identification of target users, such as in targeted digital advertising campaigns. Targeted communications, such as targeted digital advertising, may be based on customer behavioral data obtained via tracking mechanisms (e.g., cookies, tracking pixels smartphone apps, etc.). However, trends in consumer preferences and governmental regulations insist upon privacy protection when sharing consumer data. Some privacy protocols alter datasets to obfuscate user data. However, such privacy protocols may be susceptible to attacks, such as linkage attacks by linking or cross-referencing data with another database. One privacy protocol to mitigate such attacks is differential privacy, which adds a carefully controlled amount of noise to a query response. While suitable for generic queries (e.g., health research querying percentage in a locality with cancer), use of such privacy protocols is complicated in targeted communications due to a need for a return path for a source user (i.e., an individual or entity) to serve the targeted communications to target users, as well as a need for accurate reporting of viewership data (e.g., to measure campaign performance, billing reconciliation, etc.), etc.

The examples disclosed herein implement coordinated privacy for targeted communication and reporting. In particular, the examples utilize a privacy controller that alters datasets in a query response and a subsequent report, where the alteration to the dataset in the report is based on the alteration made to the dataset in the query. The privacy controller provides a return path to serve targeted communications between a source user and a target user (i.e., the actual users that meet query criteria). Further, the privacy controller coordinates the privacy added to the query and to viewership reporting to the source user. Such a configuration implements privacy protocols to automatically protect user privacy from digital attacks. The configuration also provides consistent privacy protocols, such as to accurately assess performance of a targeted communication campaign.

FIG. 1 is a block diagram of a system 10 for coordinating privacy for targeted communications and reporting, illustrating certain aspects of various embodiments disclosed herein. The system 10 includes a computing device 11 including a privacy controller 12, a processor device 14, and a memory 16 coupled to the processor device 14. Although only the privacy controller 12 is illustrated with a processor device 14 and a memory 16, any component may include a processor device 14 (or processor device set) and/or a memory 16 (or memory set).

Because the privacy controller 12 is a component of the computing device 11, functionality implemented by the privacy controller 12 may be attributed to the computing device 11 generally. Moreover, in examples where the privacy controller 12 comprises software instructions that program the processor device 14 to carry out functionality discussed herein, functionality implemented by the privacy controller 12 may be attributed herein to the processor device 14.

It is further noted that while the privacy controller 12 among other software components is shown as separate components, in other implementations, the privacy controller 12 with other software components could be implemented in a single component or could be implemented in a greater number of components than two. Finally, it is noted that while, for purposes of illustration and simplicity, the embodiments are illustrated as being implemented by a processor device set that includes a single processor device on a single computing device, in other environments, such as a distributed and/or clustered environment, the embodiments may be implemented on a computer system that includes a processor device set that includes a plurality of processor devices of a plurality of different computing devices, and functionality of the embodiments may be implemented on different processor devices of different computing devices. Thus, irrespective of the implementation, the embodiments may be implemented on a computer system that includes a processor device set made up of one or more processor devices of one or more computing devices.

The privacy controller 12 is in communication with an information system 18 and a reporting system 20, and configured to coordinate privacy in targeted communications between a source computing device 22 of a source user 21 and a target computing device 24 of a target user. Although only one target computing device 24 is illustrated, it is noted that multiple targeted computing devices 24 may be used. The privacy controller 12 is further configured to report to the source computing device 22. In certain embodiments, the target computing device 24 includes a smart TV, Roku, Chromecast, mobile device, etc. Further, in certain embodiments, the target computing device 24 uses streaming protocols, such as Microsoft HSS, Apple HLS, MPEG DASH, etc.

A source user 21 may orchestrate a targeted communication campaign. A targeted communication campaign may include a pre-campaign stage, a run campaign stage, and a post-campaign stage. The term "forward path" as used herein refers to a path from the information system 18 to the source computing device 22. The term "return path" refers to a path from the source computing device 22 to the target computing device 24. The forward path and the return path may be direct paths such that the communicating devices are in direct communication with one another or indirect paths such that the communicating devices are in communication with one another via other communicating devices or software components.

In the pre-campaign stage, the source computing device 22 transmits a query 26 to the information system 18 to identify target users for targeted communications. The query 26 may be based on, by way of non-limiting example, user demographics, TV viewing history, web browsing patterns, mobile data, or the like. The targeted communications may comprise, by way of non-limiting example, an advertisement, a health message, a safety message, etc. For example, in certain embodiments, the source user 21 may seek to identify target users that may be interested in a product or service. In certain embodiments, the source user 21 may seek to identify target users to convey health and/or safety information.

The information system 18 includes a plurality of user profiles 28. In certain embodiments, the information system 18 includes a subscriber information service (e.g., as described in SCTE (Society of Cable Telecommunications Engineers) standard 130-6). The user profiles 28 include user data and may be compiled from data given by users, deduced by user behaviors, and/or recorded from user behaviors. For example, user profiles may include user demographics such as, by way of non-limiting example, age and/or gender; TV viewing history such as, by way of non-limiting example, channels watched, viewing frequency, viewing duration, and/or preferences; web browsing patterns such as, by way of non-limiting example, websites visited, browsing frequency, browsing duration, and/or preferences; and mobile data such as, by way of non-limiting example, viewing history, browsing history, and/or app history.

The query 26 requests information about user profiles 28, sometimes referred to herein as audience records, stored within the information system 18 that meet specified criteria. The query 26 may be run as research for developing targeted communication campaigns and/or run to find matching profiles for developed targeted communication campaigns.

In certain embodiments, the query 26 is first processed by a privacy filter 30, sometimes referred to herein as a privacy layer, in communication with the privacy controller 12. The privacy filter 30 is an extension of the privacy controller 12. In certain embodiments, the privacy filter 30 is part of the privacy controller 12 and/or the information system 18. The privacy filter 30 is controlled by the privacy controller 12. The privacy filter 30 intercepts and/or redirects the query 26 for processing by, or at direction of, the privacy controller 12.

In certain embodiments, the privacy controller 12 includes a query validator 32 to assess query sensitivity and validate the query 26. In certain embodiments, the query validator 32 is part of the privacy controller 12. In other embodiments, the query validator 32 is separate from the privacy controller 12 and communicates with the privacy controller 12 via a suitable inter-process communication mechanism such as an application programming interface (API) or the like.

The query validator 32 determines whether to allow or block the query 26 from executing. The query validator 32 prevents an individual from running queries that are too sensitive and may reveal the identity of a target user. For example, an individual may run a high number of similar queries to glean private information, such as target user identity, from the data in the aggregate. As another example, there are thousands of attributes, such as demographic data and viewership data, that may be used by an individual to formulate a very focused and sensitive query 26. As yet another example, by running the same query many times and averaging out the results, an adversary may be able to make a close guess as to the actual results. Accordingly, if the query 26 is determined to be too sensitive based on predetermined rules (e.g., frequency of similar queries over a predetermined time period), the query validator 32 blocks the query 26. If the query 26 is determined not to be too sensitive, the query validator 32 allows the query 26. It is noted that the query validator 32 may be omitted in certain embodiments. However, even if the query validator 32 is omitted, the privacy filter 30 may still determine a sensitivity of the query 26 for determining privacy parameters.

Once the query validator 32 of the privacy controller 12 validates the query 26, the query 26 proceeds to the information system 18. The information system 18 then generates a dataset 34 (i.e., query results) responsive to the query 26 and based on the user profiles 28 or portions thereof or other records that meet the query criteria (e.g., zip code, income range, type of car owned, etc.) in the query 26. The information system 18 generates and transmits a query response 36 with the dataset 34.

The privacy filter 30 of the privacy controller 12 processes the query response 36 using a privacy generator 38 of the privacy controller 12 to obfuscate user data provided in the dataset 34 of the query response 36. In particular, based on a query sensitivity of the dataset 34 (e.g., size of the dataset), the privacy controller 12 alters the dataset 34 of the query response 36 by an alteration quantity 40(1), sometimes referred to as a privacy parameter, to generate an altered dataset 42(1) for transmission to the source computing device 22. The alteration quantity 40(1) may depend on the size of the dataset 34 (and therefore the database queried). For example, the same query made to different databases may result in thousands of records from one database and a handful of records from another.

In certain embodiments, altering the dataset 34 includes adding noise (e.g., based on a Laplace distribution) to obfuscate identities of individuals within the dataset 34. In certain embodiments, the alteration quantity 40(1) is within a first predetermined error margin (e.g., less than 3%). In certain embodiments, the privacy generator 32 includes a differential privacy (DP) generator 44, a k-anonymity generator 46, and/or an I-diversity generator 48 (discussed in more detail below). However, other privacy generators and/or protocols could be used.

The query response 36 with the altered dataset 42(1) (altered by the alteration quantity 40(1)) is then transmitted to the source computing device 22. In certain embodiments, query data 50 (e.g., information about the query 26, the alteration quantity 40(1), and/or the query response 36, etc.) may be stored in the information system 18 and/or the privacy controller 12 for subsequent use (e.g., as the actual user records that meet the query criteria of the query 26 may vary). For example, certain databases, such as non-relational NoSQL databases (e.g., MongoDB), provide eventual consistency rather than instant consistency, thereby giving priority to availability rather than consistency. Accordingly, the dataset 34 may not be the most recent, which may skew results of the altered dataset 42(1) (with noise added). However, the query data 50 (including the query 26, query response 36, dataset 34, altered dataset 42(1), alteration quantity 40(1), etc.) are recorded into the memory 16. Accordingly, an update to the database (e.g., data refresh or data push) may impact many records (e.g., profiles 28). Thus, if a query is made around the same time as a database update, the privacy controller 12 would sense the activity from the information system 18 and hold the query response 36 until the information system 18 is stable or eventual consistency is reached. In certain embodiments, a configurable timer is used (e.g., wait one second) to allow completion of a database update.

The source user 21 of the source computing device 22 then develops a targeted communication campaign based on the altered dataset 42(1). For example, the targeted communication campaign includes the target users, duration (e.g., number of weeks), etc. The information system 18 and/or the source computing device 22 communicates with a campaign manager 60 as to details of the targeted communication campaign. The campaign manager 60 manages, runs, and coordinates execution of the targeted communication campaign. The campaign manager 60 determines which targeted communications 66 to play and collects viewership data. In certain embodiments, the campaign manager 60 is an internal or trusted campaign manager. As a result, the privacy controller 12 is not required during the run campaign stage.

As noted above, the query data 50 (stored on the information system 18 and/or privacy controller 12) facilitates serving targeted communications 66 to the actual audience identified in the dataset 34 as opposed to the audience of the altered dataset 42(1).

The source computing device 22 is in communication with a content delivery network (CDN) 62, which is in communication with one or more target computing devices 24 via a communication client 64. The targeted communication 66 is selected based on the matching profiles 28 retrieved from information system 18 through the query 26. The source computing device 22 provides targeted communications 66 to the CDN 62 or service provider (e.g., Charter Spectrum TV, Xfinity, U-verse, etc.). In certain embodiments, the targeted communications 66 may be assigned a unique URL (uniform resource locator). The URL may be used by target computing devices 24 to access the targeted communication 46 from the CDN 62.

The CDN 62 further includes media content 68 (e.g., television, video, etc.) to stream to the target computing device 24. For example, a content provider (e.g., CBS, Disney, TNT, etc.) supplies media content 68 with targeted communication breaks at select points during the media content 68. Such breaks may be indicated by SCTE-35 markers by an encoder or transcoder to denote start and end timestamps of communication segments for replacement with targeted communications 66. A packager may be used to break the media content 68 into many segments, and creates a manifest 70, which is a listing of all of the video segments including media content 68 and communication segments interspersed throughout the media content 68. The manifest 70 is used by target computing devices 24 to play media content 68 and communication segments in a sequential manner. In certain embodiments, for each entry in the manifest 70, the URL on the CDN 62 is listed to enable target computing devices 24 to locate and download media content 50 and communication segments. In certain embodiments, the manifest 70 includes metadata about media content 68 for the target computing device 24 to download the media content 68 from the CDN 62.

The CDN 62 further includes a manifest manipulator 72 to update entries in the manifest 70. In particular, in the run campaign stage (i.e., during duration of the targeted communication campaign), and at indication of a communication break in the media content 68 provided to a target computing device 24, a default communication segment, sometimes referred to as a default communication, may be replaced with a targeted communication 66 instead. In particular, a target computing device 24, using a communication client 64, transmits a request 74 to the CDN 62 for media content 68 and/or targeted communications 66 provided by the manifest 70. In certain embodiments, the identity of the target user of the target computing device 24 may be hidden via cryptographic hashing.

In response, the CDN 62 checks with a communication decision server 76 of a campaign manager 60 as to whether the target computing device 24 is identified in a targeted communication campaign. The communication decision server 76 of the campaign manager 60 confirms with the CDN 62 that the target computing device 24 is identified in the targeted communication campaign and/or provides the targeted communication 66 (or URL thereof). As a result, the manifest manipulator 72 of the CDN 62 manipulates the manifest 70 so that the targeted communications 66 or URLS thereof are transmitted to the target computing device 24.

When the target computing device 24 receives the targeted communication 66, the target computing device 24 transmits beacons 80, sometimes referred to as impression beacons, to the campaign manager 60. In certain embodiments, the beacons 80 are transmitted to the manifest manipulator 72, which then forwards the beacons 80 to the campaign manager 60. The beacons 80 notify the campaign manager 60 as to the progress of display of the targeted communication 66 (e.g., at each quartile of the targeted communication 66). The campaign manager 60 records such viewership data during the targeted communication campaign.

In the post-campaign stage (upon completion of the targeted communication campaign), the campaign manager compiles and transmits viewership data 86 to the reporting system 20. The viewership data 86 includes communication served data 88 (related to transmission of the targeted communication 66 to the target computing device 24) and/or communication viewed data 90 (related to the beacons 80). In certain embodiments, the reporting system 20 and/or campaign manager 60 provides viewership data 86 and/or a dataset 92 to traffic and billing systems. In certain embodiments, the communication viewed data 90 requires at least half of a targeted communication 66 in view to a target user on a target computing device 24 for at least one second for display ads or two seconds for video ads.

The reporting system 20 generates and transmits a report 91 with a dataset 92 for reporting results of the targeted communication campaign to the source computing device 22 of the source user 21. For example, the source user 21 may want to know if the targeted communications 66 were displayed as agreed and/or how the targeted communications 66 were received (i.e., viewed) by the target users, such as for tracking performance and/or improving targeted communication campaigns.

Privacy filter 94, similar to privacy filter 30, intercepts and/or redirects the report 91 for processing by or at direction of the privacy controller 12. The privacy filter 94 must be applied for verification data sent to the source computing device 22 to protect the privacy of the target users. In particular, the privacy generator 38 processes the dataset 92 to introduce an alteration quantity 40(2) and generate an altered dataset 42(2). The alteration quantity 40(2) of the altered dataset 42(2) of the report 91 is based on the alteration quantity 40(1) of the altered dataset 42(1) of the query response 36. The privacy controller 12 may use the query data 50 to determine the alteration quantity 42(2) for consistency between the query response 36 and the report 91. If different alteration quantities 40(1), 40(2) are used, the altered datasets 42(1), 42(2) may not be consistent with one another or representative of the performance of the targeted communication campaign. In a simple case of equal statistical populations, the same alteration quantity (e.g., noise parameters) need to be applied for data sources and data reported. For example, the alteration quantity to maintain privacy for a population of 100 compared to 10,000 may be different, as the Laplace distribution is not linear.

The privacy controller 12 then transmits the report 91 with the altered dataset 42(2) to the source computing device 22. In certain embodiments, the reporting system 20 stores a copy of the unaltered dataset 92, such as to verify the actual results in an audit (e.g., for billing). Doing so ensures that privacy is protected (reported statistics with noise added) and the source user 21 is billed accurately (actual audience served).

Figure 2:
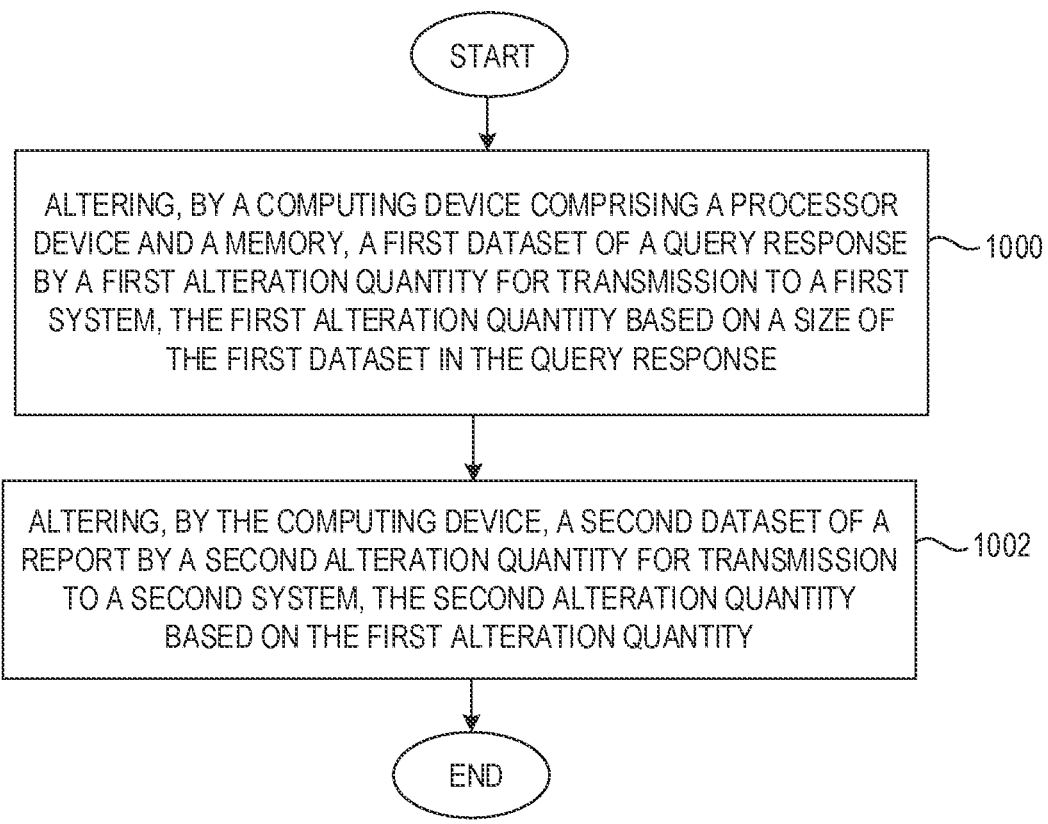
FIG. 2 is a flowchart illustrating processing steps for coordinating privacy for targeted communications and reporting.

FIG. 2 is a flowchart illustrating processing steps using the system of FIG. 1. The computing device 11, with a processor device 14 and a memory 16, alters a first dataset 34 of a query response 36 by a first alteration quantity 42(1) for transmission to a source computing device 22 (1000). The first alteration quantity 42(1) is based on a size of the first dataset 34 in the query response 36. The computing device 11 alters a second dataset 92 of a report 91 by a second alteration quantity for transmission to the source computing device 22 (1002). The second alteration quantity 42(2) is based on the first alteration quantity 42(1).

In certain embodiments, altering the first dataset 34 includes altering the first dataset 34 using at least one of a differential privacy generator 44, a k-anonymity generator 46, or an l-diversity generator 48. The differential privacy generator 44 adds noise by changing values within the first dataset 34 based on a size of the first dataset 34. The k-anonymity generator 46 at least one of suppresses or generalizes values such that every individual within each generalized block is indistinguishable from at least k−1 other individuals. Each generalized block is based on selected attributes. The l-diversity generator 48 ensures l different values of a sensitive attribute within each generalized block.

In certain embodiments, altering the first dataset 34 includes adding noise (e.g., based on a Laplace distribution) to obfuscate identities of individuals within the first dataset 34. In certain embodiments, the first alteration quantity 40(1) is within a first predetermined error margin (e.g., less than 3%).

In certain embodiments, the computing device 11 further receives the query response 36 from a user information system 18, which includes user profiles 28. The query response 36 is in reply to a query requesting user profiles 28 for serving targeted communications 66. The computing device 11 further receives the report 91 from a reporting system 20. The reporting system 20 includes communications-served data 88 and/or communications-viewed data 90, which requires at least half of a targeted communication 66 in view for at least one second. In certain embodiments, the reporting system 20 stores a second unaltered dataset 92.

In certain embodiments, the computing device 11 directs a fake records server 150 to generate a number of fake records 152 based on the first alteration quantity 40(1). A "fake record 152" is a record that is created by the computing device 11 and is not associated with an actual user. In certain embodiments, the fake records server 150 sends fake requests 154 for targeted communications 66. In certain embodiments, the fake records server 150 transmits fake beacons 156, and alters viewership data 158 sent to the reporting system 20 based on the fake beacons 156. A "fake beacon" is a beacon sent by a computing device and is not associated with actual user behavior. In certain embodiments, the fake records server 150 removes the fake beacon data from the viewership data 158 to generate filtered viewership data 162.

In certain embodiments, the computing device 11 blocks, based on predetermined rules, a second query 26. In certain embodiments, the predetermined rules include blocking a query 26 based on frequency of similar queries over a predetermined time period.

FIG. 3 is a chart illustrating a differential privacy (DP) generator 44 of the privacy controller 12 of FIG. 1. The differential privacy generator 44 adds an alteration quantity 40(1), 40(2) (referred to generally as alteration quantity 40) to a result, thereby protecting user identity. In particular, only a portion of the records are changed, thereby providing plausible deniability. It is not possible to establish if data is truly associated with a person or randomly generated. In this way, adding or removing any one person's individual data to a dataset should not materially change the results of a query. The aggregate statistical average remains unchanged. However, there needs to be a balance between utility (and accuracy) and privacy, as enhancing one compromises the other. The alteration quantity 40 may also be referred to as a privacy-budget (c), sometimes referred to as privacy loss parameter. The privacy-budget (c) may be recorded in the query data 50.

For example, assume a database of just 10 customers. In response to the question, 'Do you smoke?', seven have answered "Yes" and three have answered "No." Assume a noise margin of ±1 (although the noise margin is usually given as a percentage (e.g., 2%, 3%, etc.). The differential privacy generator 44 may add noise by changing values within a dataset based on a size of the dataset. When the query is run, the responses 110(1)-110(3) could be 6, 7, or 8 for "Yes." The table shows three possible query responses 110(1)-110(3) that could be provided by the DP generator 44 in reference to the same query 26.

In certain embodiments, the DP generator 44 relies upon Laplace distribution, but other statistical distributions (e.g., Gaussian noise, binomial, etc.) may also be used. Differential Privacy may be implemented in two modes. Global differential privacy refers to the case of adding noise to queries on a database of records (e.g., U.S. census). Local differential privacy refers to adding noise at the device level (e.g., Apple iPhone, Google Chrome browser, etc.).

FIGS. 4A and 4B are charts illustrating a k-anonymity generator to at least one of suppress or generalize values such that every individual within each generalized block 112(1)-112(3) is indistinguishable from at least k−1 other individuals. Each generalized block is based on selected attributes. For example, comparing FIGS. 4A and 4B, the chart of FIG. 4B has a k=3 anonymity because for the classes selected, such as postcode and age group, there are at least three records for each generalized block 112(1)-112(3).

FIG. 5 is a chart illustrating an l-diversity generator to ensure l different values of a sensitive attribute within each generalized block 114(1)-114(2). In particular, k-anonymous datasets are susceptible to homogenous pattern attacks and background knowledge attacks. As a result, l-diversity acts as an extension of k-anonymity to ensure that the anonymous record is well represented within each generalized block 114(1)-114(2). For example, the chart of FIG. 5 has an l=2 diversity because for each generalized block 114(1)-114(2) there are no more than two records that have the same sensitive attribute.

Figure 6A:
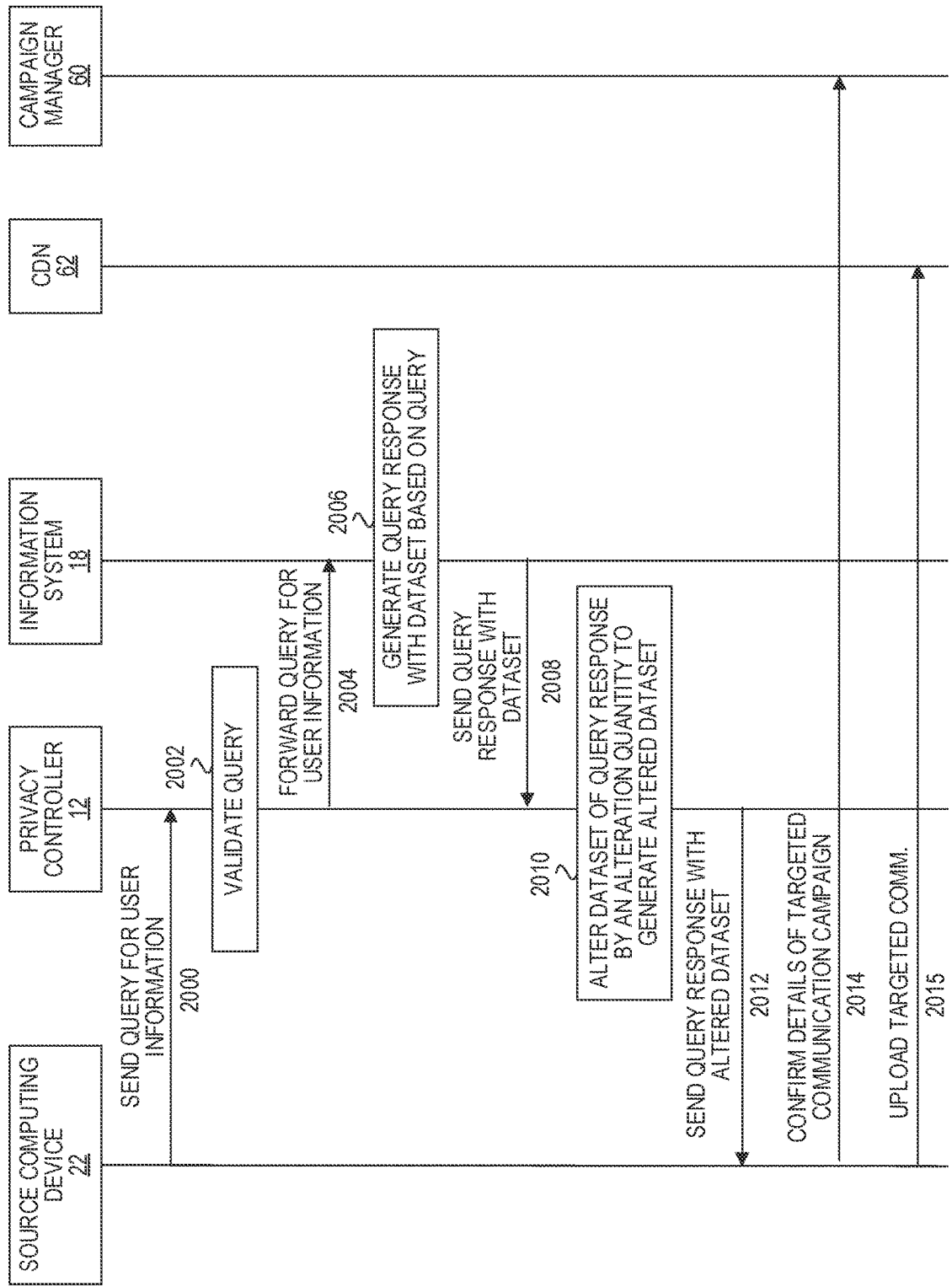
FIG. 6A is a message sequence diagram illustrating example messages communicated between and actions taken by several of the elements illustrated in FIG. 1 to protect target user privacy in a query response, according to one embodiment.

FIG. 6A is a message sequence diagram illustrating example messages communicated between and actions taken by several of the elements illustrated in FIG. 1 to protect target user privacy in a query response during a pre-campaign stage, according to one embodiment. The computing device 22 sends a query 26 for user information (from user profiles 28) to a privacy controller 12 (or a privacy filter 30 in communication with the privacy controller 12) (2000). The privacy controller 12 validates the query 26 (e.g., using the query validator 32) (2002). Once validated, the privacy controller 12 (or privacy filter 30) forwards the query 26 for user information to the information system 18 (2004). The information system processes the query 26 and generates a query response 36 with a dataset 34 based on the query 26 (2006). The information system 18 sends the query response 36 with the dataset 34 to the privacy controller 12 (or a privacy filter 30 in communication with the privacy controller 12) (2008). In certain embodiments, the information system 18 only generates the dataset 34 and forwards the dataset 34 to the privacy controller 12.

The privacy controller 12 (e.g., using a privacy generator 38) alters the dataset 34 of the query response 36 by an alteration quantity 40(1) to generate an altered dataset 42(1) (2010). As noted above, in certain embodiments, the privacy controller 12 uses a DP generator 44, k-anonymity generator 46, and/or I-diversity generator 48, or any other privacy generator. The privacy controller 12 (or privacy filter 30) forwards the query response 36 with the altered dataset 42(1) to the source computing device 22. The source computing device 22 confirms details of a targeted communication campaign with a campaign manager 60 (2014). The source computing device 22 uploads targeted communications to a CDN 62 (2015).

Figure 6B:
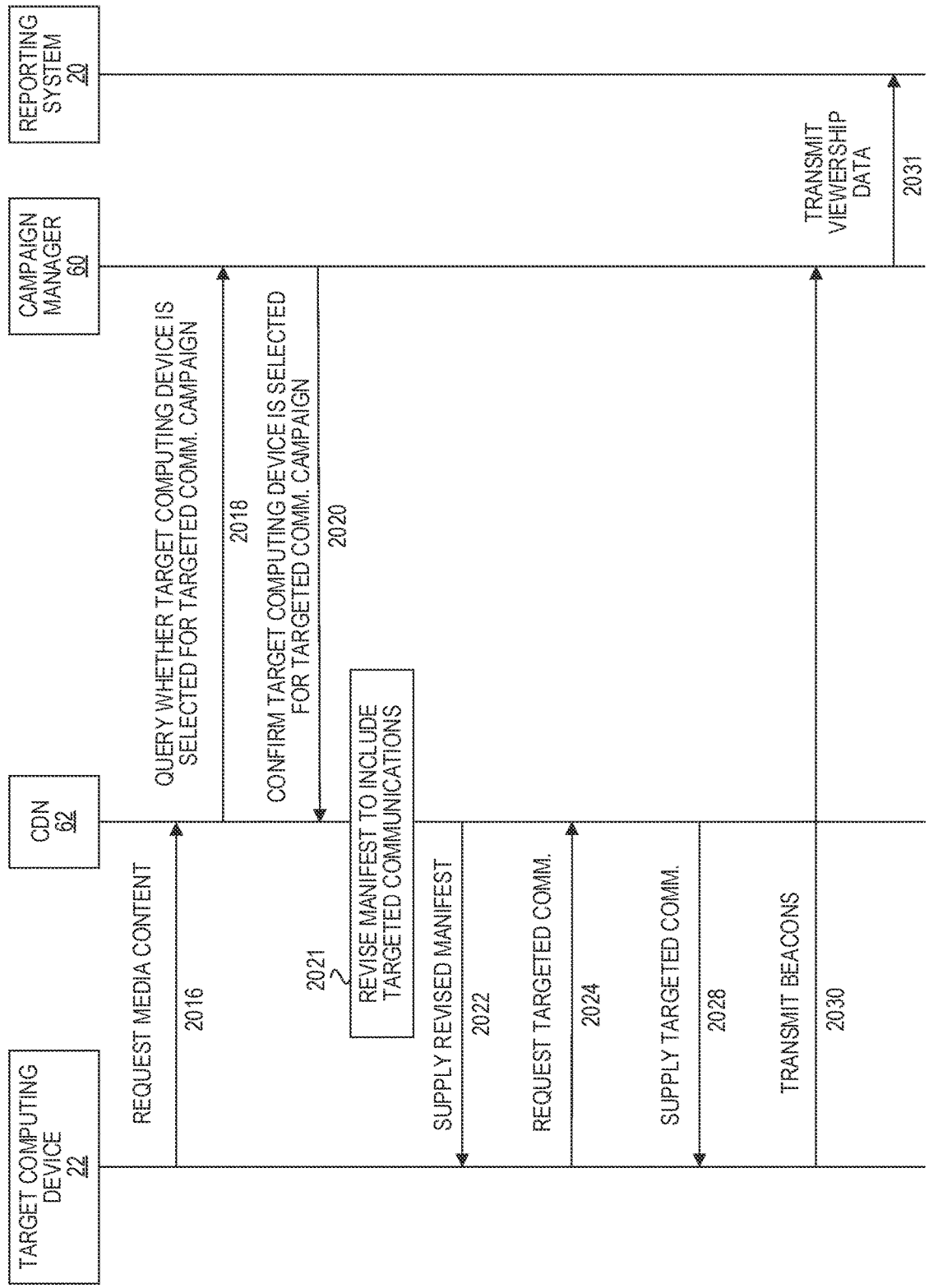
FIG. 6B is a message sequence diagram illustrating example messages communicated between and actions taken by several of the elements illustrated in FIG. 1 to run a targeted communication campaign, according to one embodiment.

FIG. 6B is a message sequence diagram illustrating example messages communicated between and actions taken by several of the elements illustrated in FIG. 1 to run a targeted communication campaign during a run campaign stage, according to one embodiment. The target computing device 22 requests media content 68 and/or targeted communications 66 from the CDN 62 (2016). The CDN 62 queries the campaign manager 60 as to whether the target computing device 22 is selected for the targeted communication campaign (2018). The campaign manager 60 confirms that the target computing device 22 is selected for the targeted communication campaign (2020). The CDN 62 (i.e., the manifest manipulator 72 thereof) revises a manifest 70 to include targeted communications 66 (and replace the default communications). The CDN 62 supplies the revised manifest 70 to the target computing device 22 (2022). The target computing device 22, based on the manifest 70 (a URL therein), requests a targeted communication from the CDN 62 (e.g., from an origin server of the CDN 62) (2024). The CDN 62 (e.g., an origin server thereof) supplies the targeted communication 66 to the target computing device (2028). The target computing device 22 transmits beacons 80 (e.g., at quartiles) to the campaign manager 60 while viewing the targeted communication 66 (2028). The campaign manager 60 transmits viewership data 86 to the reporting system 20 (2031).

Figure 6C:
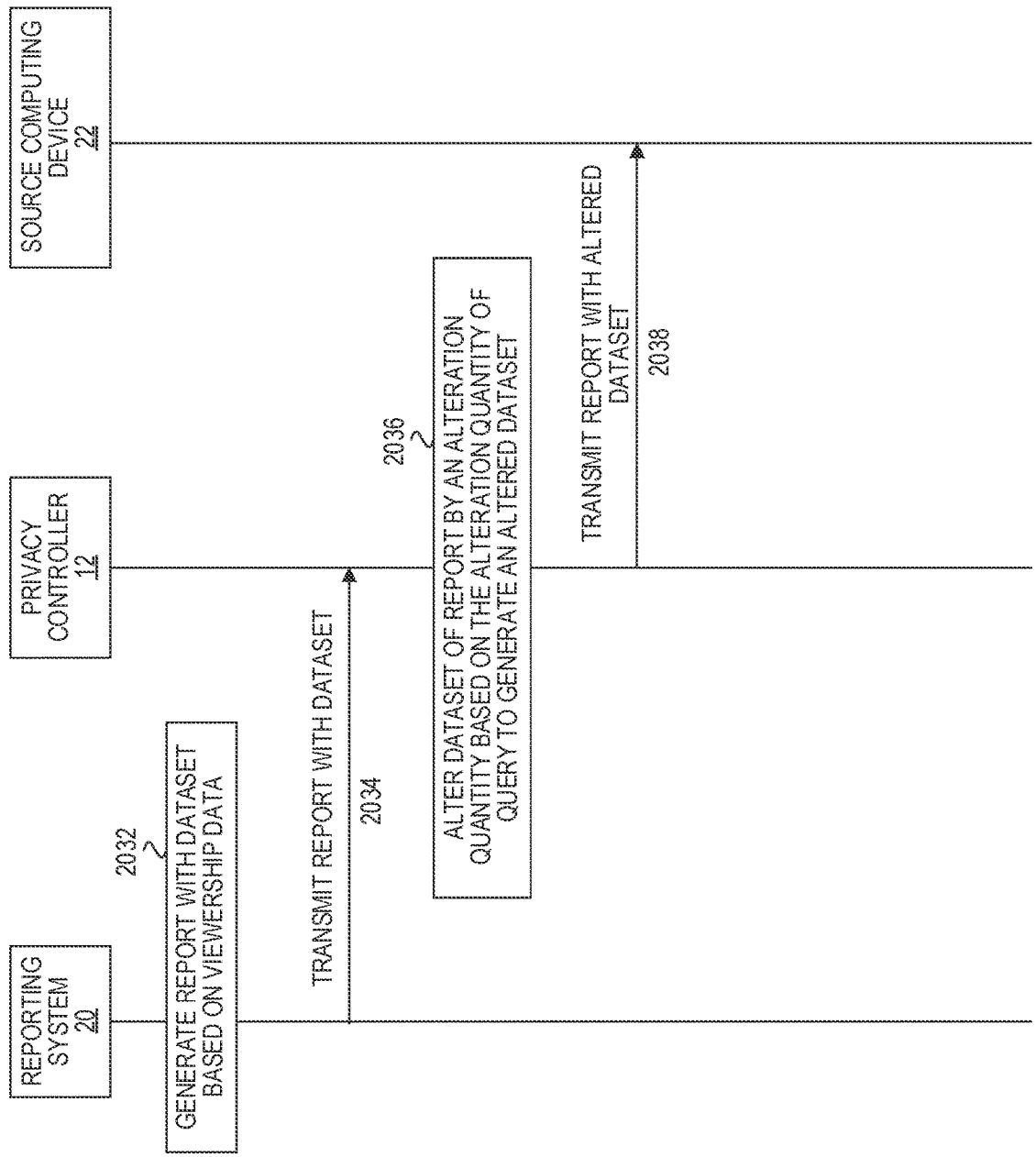
FIG. 6C is a message sequence diagram illustrating example messages communicated between and actions taken by several of the elements illustrated in FIG. 1 to protect target user privacy in a report, according to one embodiment.

FIG. 6C is a message sequence diagram illustrating example messages communicated between and actions taken by several of the elements illustrated in FIG. 1 to protect target user privacy in a report during a post-campaign stage, according to one embodiment. The reporting system 20 generates a report 91 with a dataset 92 based on viewership data 86 (2032). The reporting system 20 transmits the report 91 with the dataset 92 to the privacy controller 12 (or a privacy filter 94 of the privacy controller 12) (2034). The privacy controller 12 alters the dataset 92 of the report 91 by an alteration quantity 40(2) based on the alteration quantity 40(1) of the query 26 to generate an altered dataset 42(2). As noted above, in certain embodiments, the privacy controller 12 uses a DP generator 44, k-anonymity generator 46, and/or I-diversity generator 48, or any other privacy generator. The privacy controller 12 transmits the report 91 with the altered dataset 42(2) to the source computing device 22 (2038).

As noted above, such a configuration provides consistency in the privacy loss between the query 26 and the report 91 for a consistent balance of privacy and utility. As a result, a source user 21 can more accurately assess performance of the targeted communication campaign.

Figure 7:
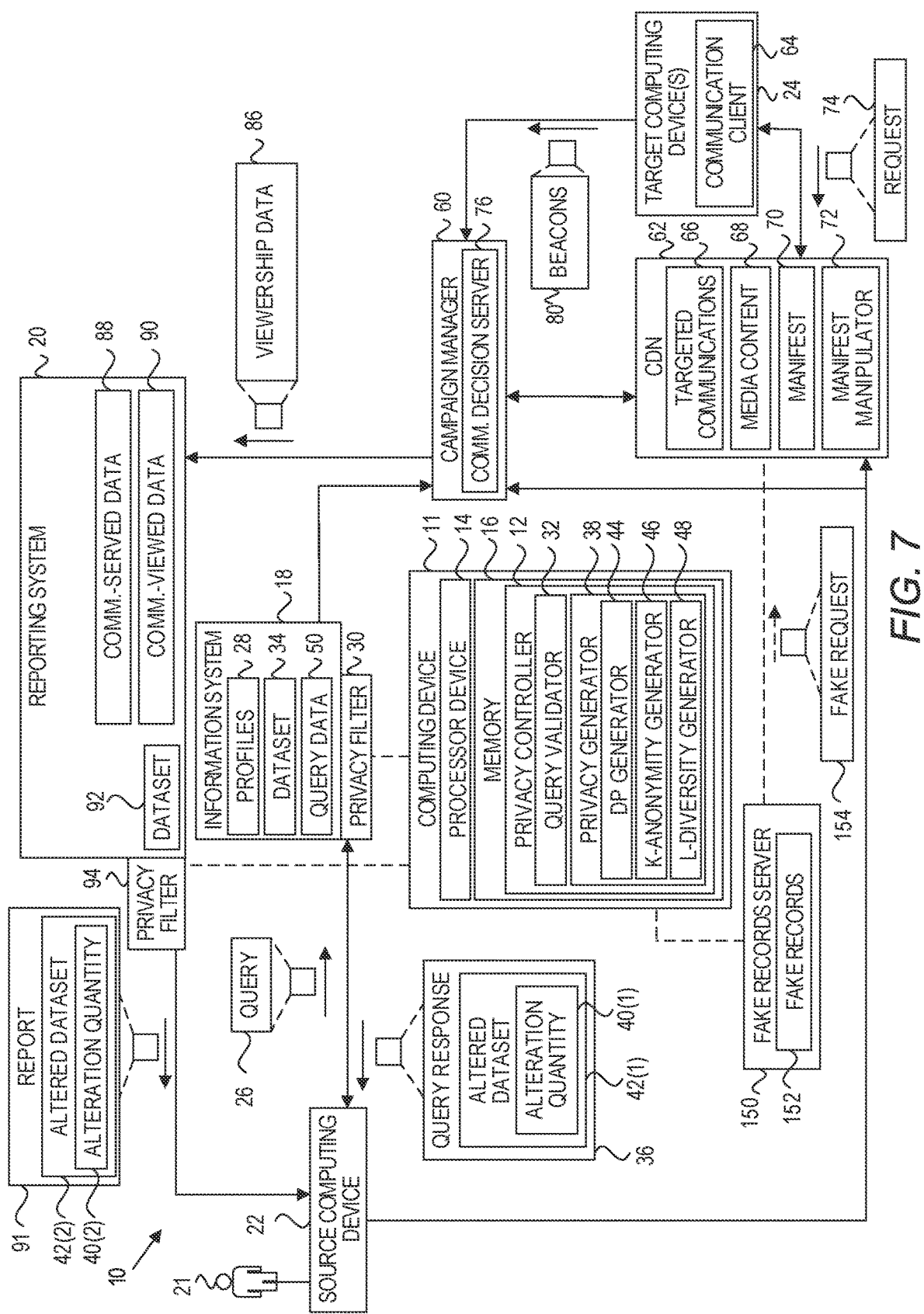
FIG. 7 is a block diagram of another embodiment of a system for coordinating privacy for targeted communications and reporting using a privacy controller and a fake records server to generate fake requests, illustrating certain aspects of various embodiments disclosed herein.

FIG. 7 is a block diagram of another embodiment of a system for coordinating privacy for targeted communications and reporting using a privacy controller and a fake records server to generate fake requests, illustrating certain aspects of various embodiments disclosed herein. In particular, when an external or untrusted campaign manager 60 is involved, the privacy controller 12 directs a fake records server 150, or a fake records generator in communication with the fake records server 150, to generate fake records 152 based on the query 26 so as to meet the criteria in the query 26 of a target user. Further, the fake records server 150 (or fake records generator) transmits fake requests 154 for media content 68 and/or targeted communications 66 (e.g., based on the first alteration quantity 40(1)). For example, when using differential privacy, the fake records 152 could be inversely proportional to the privacy budget (c). In certain embodiments, the privacy controller 12 could indicate that the fake records 152 generated should be about or less than 5% of the total audience (e.g., less than 3%, less than 2%, etc.).

The fake records server 150 sends the fake request 154 for media content 68 to the CDN 62. The campaign manager 60 confirms that the fake request 154 identifies a target user in the targeted communication campaign and directs the CDN 62 to send targeted communications 66. The CDN 62 forwards the manifest 70 with the media content 68 and the targeted communications 66, which is then discarded by the fake records server 150.

The amount of fake records 152 must be large enough to protect privacy but not too large as to dilute the query 26. For example, a SHA-256 hash is based on a MAC address of the fake records server 150. Fake hashes can be created by randomly changing a few alpha-numeric values in the hash. As the fake hashes do not correspond to actual computing devices, any targeted communication directed to a fake device address or received by the fake records server 150 is discarded. Further, such a configuration does not impact viewership data 86 because the fake records server 150 does not send beacons 80 and does not even request the targeted communication 66. As a result, the communication served data 88 and the communication viewed data 90 are unaffected by the fake records server 150, but the campaign manager 60 cannot discern which are real requests and fake requests, thereby protecting user privacy.

Figure 8:
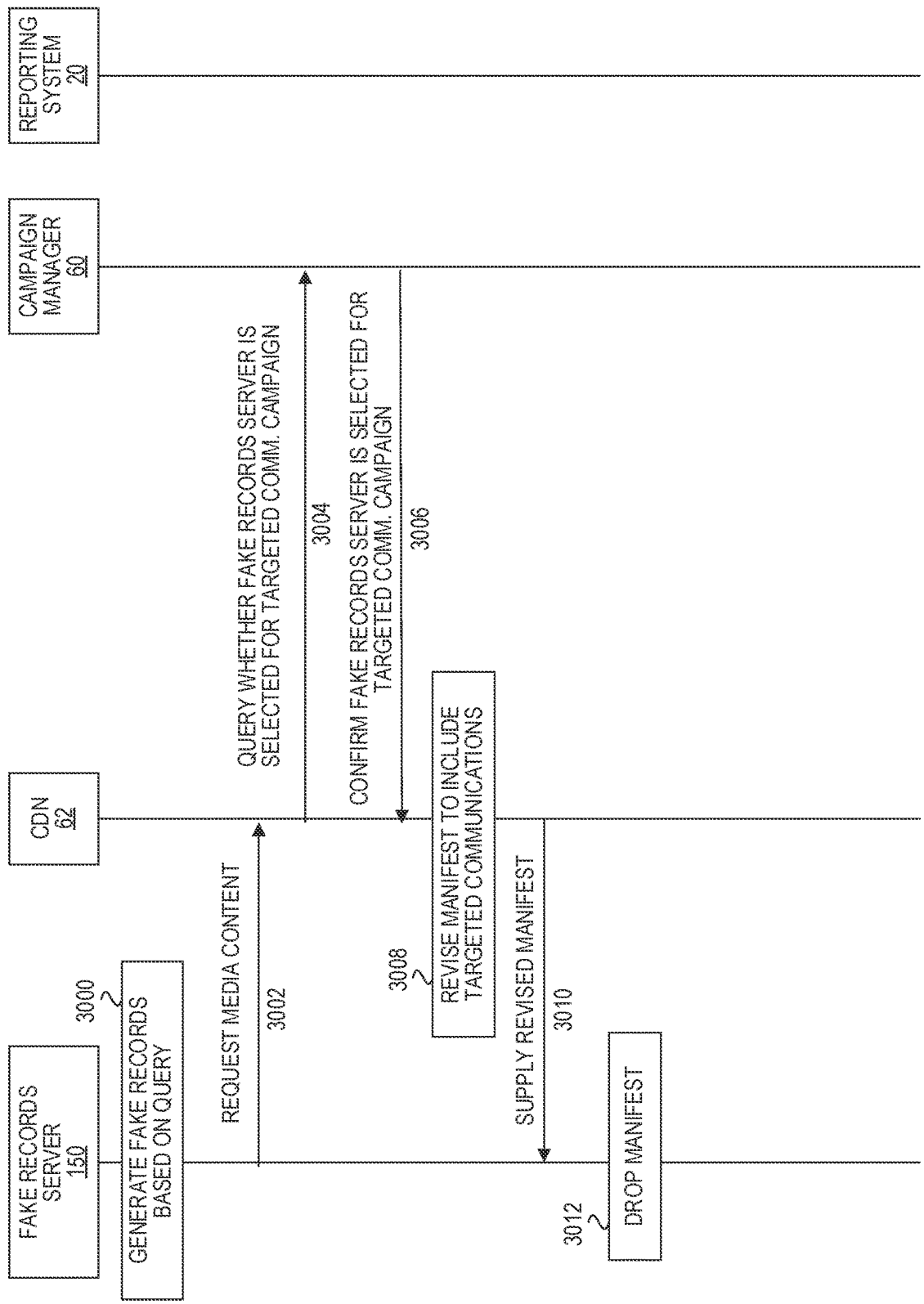
FIG. 8 is a message sequence diagram illustrating example messages communicated between and actions taken by several of the elements illustrated in FIG. 7 using the fake records server to generate fake requests.

FIG. 8 is a message sequence diagram illustrating example messages communicated between and actions taken by several of the elements illustrated in FIG. 7 using the fake records server to generate fake requests. The fake records server 150 generates fake records 152 based on the query 26, so as to match criteria of a target user (3000). The fake records server 150 transmits a fake request 154 for media content 68 to the CDN 62 (3002). The CDN 62 queries whether the fake records server 150 is selected for targeted communication campaign (3004). The campaign manager 60 confirms the fake records server is selected for the targeted communication campaign (3006). The CDN revises the manifest 70 to include targeted communications 66 (3008). The CDN 62 supplies the revised manifest 70 to the fake records server 150 (3010). The fake records server 150 then drops the manifest 70 (3012). Accordingly, as noted above, the campaign manager 60 is unaware that the request is fake and viewership data 86 is unaffected (because beacons 80 are not transmitted by the fake records server 150).

Figure 9:
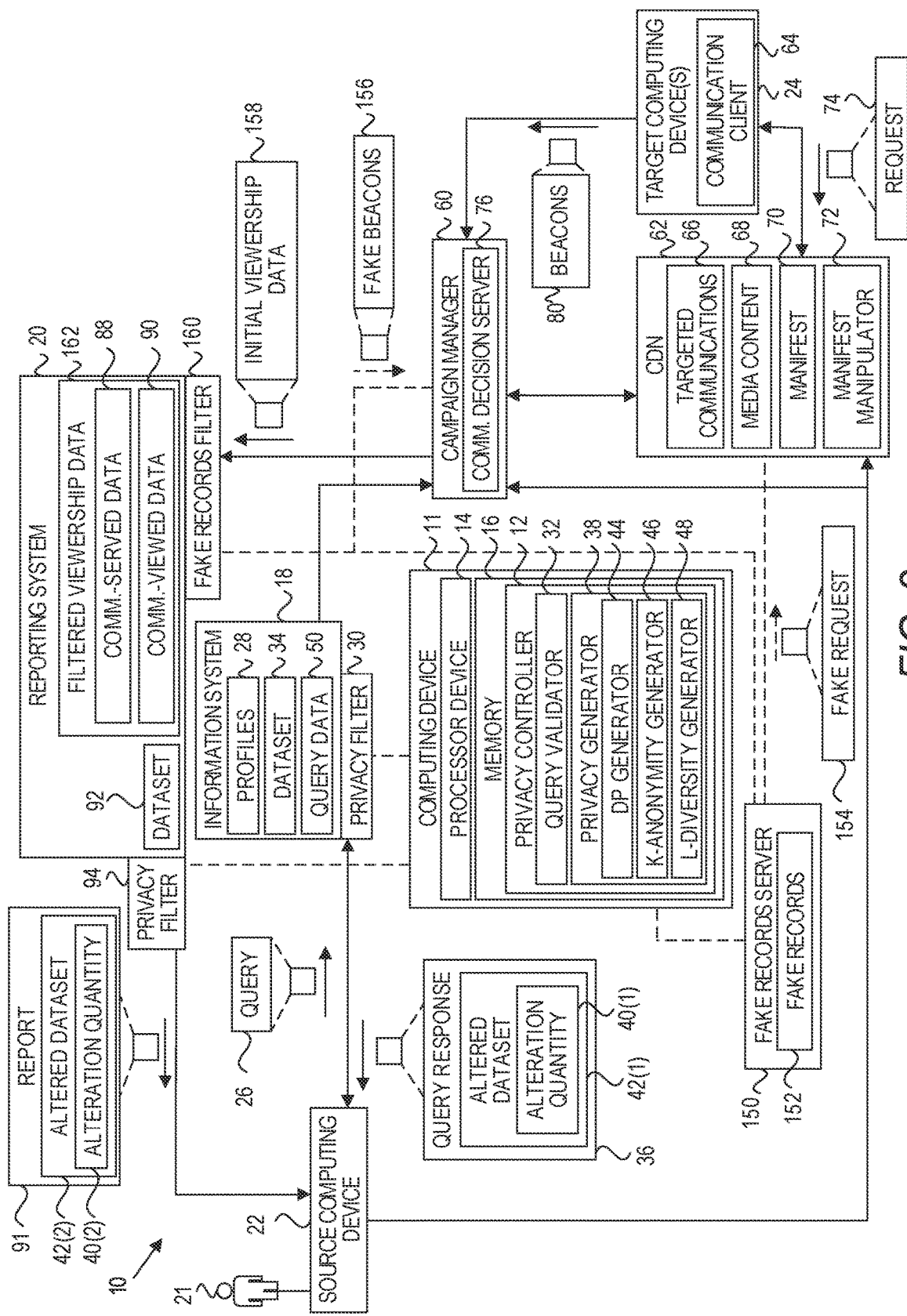
FIG. 9 is a block diagram of another embodiment of a system for coordinating privacy for targeted communications and reporting using a privacy controller and a fake records server to generate fake beacons, illustrating certain aspects of various embodiments disclosed herein.

FIG. 9 is a block diagram of another embodiment of a system for coordinating privacy for targeted communications and reporting using a privacy controller and a fake records server to generate fake beacons, illustrating certain aspects of various embodiments disclosed herein. In this embodiment, the fake records server 150 includes additional functionality to send fake beacons 156. The fake records server 150 keeps records as to the fake beacons 156 sent for subsequent filtering. In particular, the fake records server parses the manifest 70 supplied by the CDN 62 and sends fake beacons 156 (e.g., quartile beacons) to the campaign manager 60.

The campaign manager 60 sends initial viewership data 158 to the reporting system 20. A fake records filter 160 intercepts and/or redirects the initial viewership data 158 for processing by (or at direction of) the fake records server 150. The fake records filter 160 removes data related to the fake beacons 156 to generate filtered viewership data 162, which is then provided to the reporting system 20. Accordingly, the fake beacons 156 do not impact viewership data reported to the source computing device 22.

Figure 10:
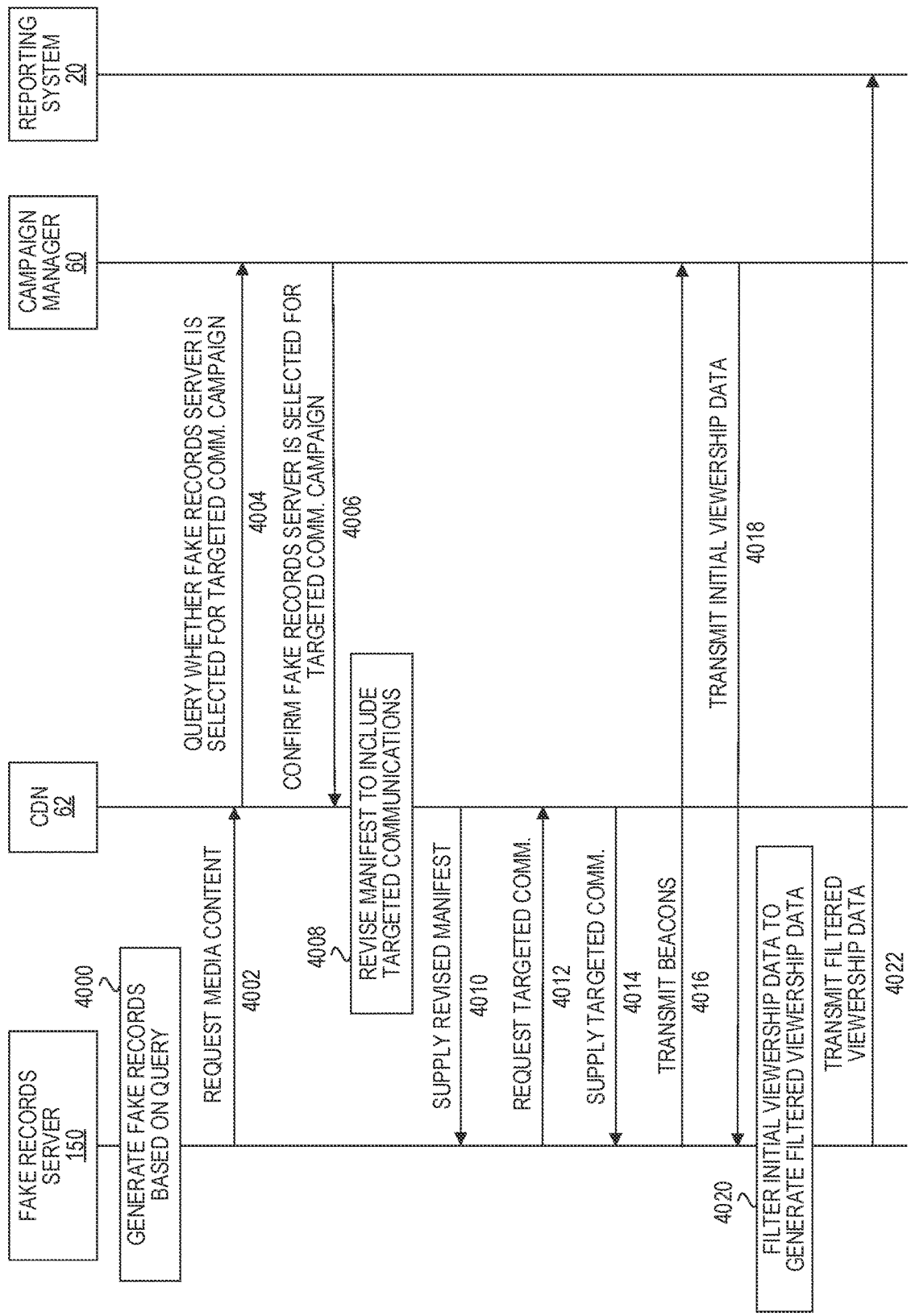
FIG. 10 is a message sequence diagram illustrating example messages communicated between and actions taken by several of the elements illustrated in FIG. 9 using the fake records server to generate fake beacons.

FIG. 10 is a message sequence diagram illustrating example messages communicated between and actions taken by several of the elements illustrated in FIG. 9 using the fake records server 150 to generate fake beacons 156. As in FIG. 8 discussed above, the fake records server 150 generates fake records 152 based on the query 26, so as to match criteria of a target user (4000). The fake records server 150 transmits a fake request 154 for media content 68 to the CDN 62 (4002). The CDN 62 queries whether the fake records server 150 is selected for a targeted communication campaign (4004). The campaign manager 60 confirms the fake records server 150 is selected for the targeted communication campaign (4006). The CDN revises the manifest 70 to include targeted communications 66 (4008). The CDN 62 supplies the revised manifest 70 to the fake records server 150 (4010). The fake records server 150 then drops the manifest 70 (4012). Accordingly, as noted above, the campaign manager 60 is unaware that the request is fake and viewership data 86 is unaffected (because beacons 80 are not transmitted by the fake records server 150).

The fake records server 150 requests targeted communications 66 from the CDN 62 (4012). The CDN 62 supplies the targeted communication 66 to the fake records server 150 (4014). The fake records server 150 transmits fake beacons 156 to the campaign manager 60 (e.g., through the manifest manipulator 72). The campaign manager 60 transmits initial viewership data 158 to the fake records server 150 (4018). The fake records server 150 filters the viewership data 158 to remove data related to the fake beacons 156 and generate filtered viewership data 162 (4020). The fake records server 150 then transmits the filtered viewership data 162 to the reporting system 20 (4022).

Figure 11:
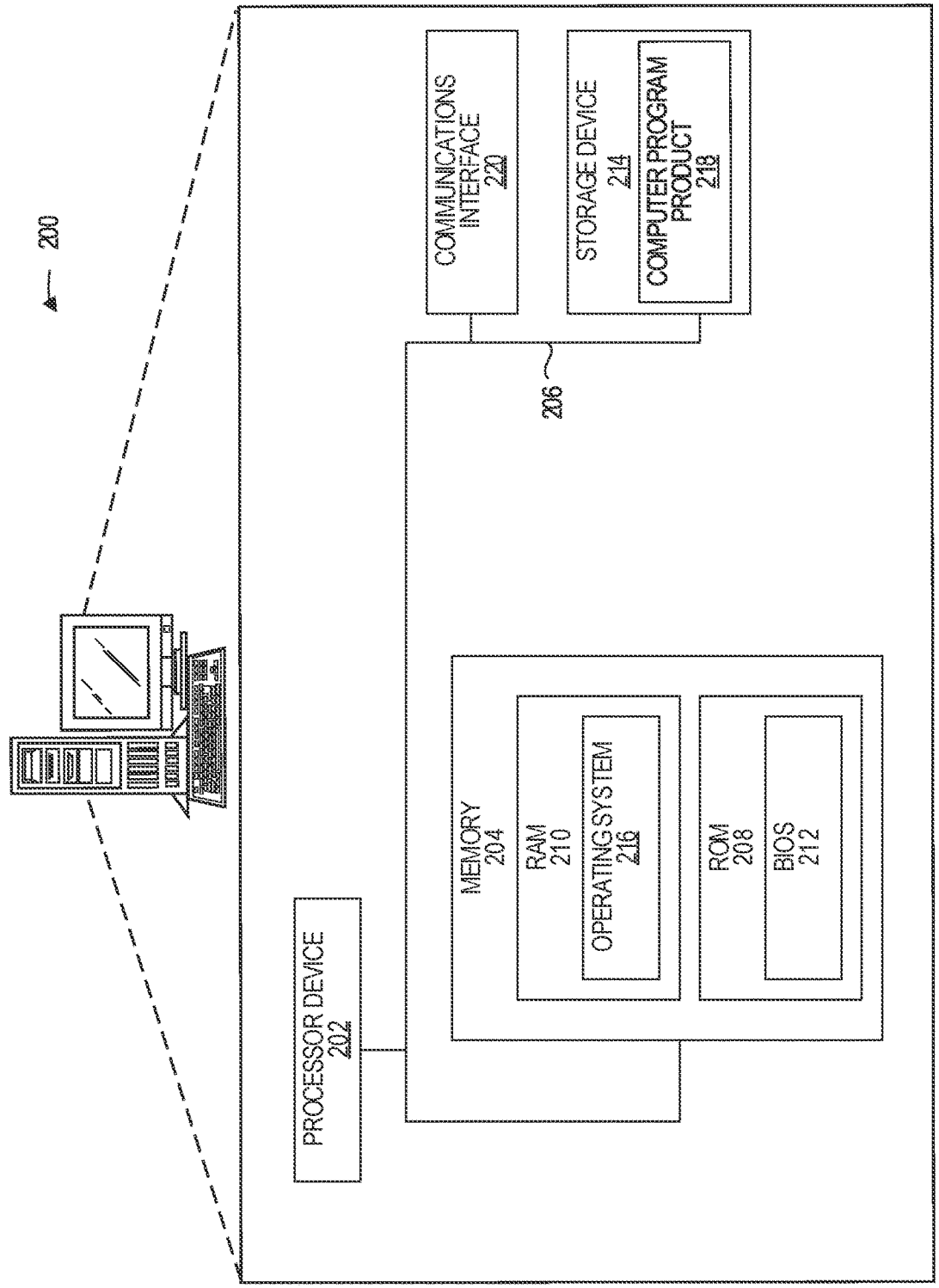
FIG. 11 is a block diagram of a computing device suitable for implementing one or more of the processing devices disclosed herein, according to one embodiment.

FIG. 11 is a block diagram of a computing device 200 containing components suitable for implementing any of the processing devices disclosed herein. The computing device 200 includes a processor device 202, a system memory 204, and a system bus 206. The system bus 206 provides an interface for system components including, but not limited to, the system memory 204 and the processor device 202. The processor device 202 can be any commercially available or proprietary processor.

The system bus 206 may be any of several types of bus structures that may further interconnect to a memory bus (with or without a memory controller), a peripheral bus, and/or a local bus using any of a variety of commercially available bus architectures. The system memory 204 may include non-volatile memory 208 (e.g., read-only memory (ROM), erasable programmable read-only memory (EPROM), electrically erasable programmable read-only memory (EEPROM), etc.), and volatile memory 210 (e.g., random-access memory (RAM)). A basic input/output system (BIOS) 212 may be stored in the non-volatile memory 208 and can include the basic routines that help transfer information between elements within the source computing device 200. The volatile memory 210 may also include a high-speed RAM, such as static RAM, for caching data.

The computing device 200 may further include or be coupled to a non-transitory computer-readable storage medium such as a storage device 214, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 214 and other drives associated with computer-readable media and computer-usable media may provide non-volatile storage of data, data structures, computer-executable instructions, and the like.

A number of modules can be stored in the storage device 214 and in the volatile memory 210, including an operating system 216 and one or more program modules, which may implement the functionality described herein in whole or in part. All or a portion of the examples may be implemented as a computer program product 218 stored on a transitory or non-transitory computer-usable or computer-readable storage medium, such as the storage device 214, which includes complex programming instructions, such as complex computer-readable program code, to cause the processor device 202 to carry out the steps described herein. Thus, the computer-readable program code can comprise software instructions for implementing the functionality of the examples described herein when executed on the processor device 202. The processor device 202, in conjunction with the network manager in the volatile memory 210, may serve as a controller or control system for the computing device 200 that is to implement the functionality described herein.

The computing device 200 may also include one or more communication interfaces 220, depending on the particular functionality of the computing device 200. The communication interfaces 220 may comprise one or more wired Ethernet transceivers, wireless transceivers, fiber, satellite, and/or coaxial interfaces by way of non-limiting examples.

Those skilled in the art will recognize improvements and modifications to the preferred embodiments of the disclosure. All such improvements and modifications are considered within the scope of the concepts disclosed herein and the claims that follow.

What is claimed is:

1. A method comprising:
   receiving, by a computing device, a query response from a user information system, the user information system including a plurality of user profiles, the query response comprising information associated with a plurality of users and being in reply to a first query requesting user profiles for serving targeted communications;
   altering, by the computing device, a first dataset of the query response by a first alteration quantity for transmission to a source computing device, the first alteration quantity based on a size of the first dataset in the query response, wherein the first dataset is altered by one of changing a data value in the first dataset, removing a data value from the first dataset, or adding a data value to the first dataset;
   storing query data identifying the first alteration quantity;
   receiving, by the computing device, a report from a reporting system, the reporting system including communications-viewed data from at least some target computing devices associated with corresponding user profiles of the plurality of user profiles, wherein the report indicates a targeted communication was viewed on a targeted computing device;

accessing, by the computing device, the query data to determine the first alteration quantity; and altering, by the computing device, a second dataset of the report by a second alteration quantity for transmission to the source computing device, the second alteration quantity based on the first alteration quantity.

2. The method of claim 1, wherein altering the first dataset comprises altering the first dataset using at least one of:

a differential privacy generator to add noise by changing values within the first dataset based on a size of the first dataset;

a k-anonymity generator to at least one of suppress or generalize values such that every individual within each generalized block is indistinguishable from at least k−1 other individuals, each generalized block based on selected attributes; or an I-diversity generator to ensure I different values of a sensitive attribute within each generalized block.

3. The method of claim 1, wherein altering the first dataset comprises adding noise to obfuscate identities of individuals within the first dataset.

4. The method of claim 3, wherein the noise is based on a Laplace distribution.

5. The method of claim 1, wherein the first alteration quantity is within a first predetermined error margin.

6. The method of claim 5, wherein the first predetermined error margin is less than 3%.

7. The method of claim 1, wherein the report indicates a targeted communication was viewed in response to at least half of the targeted communication being in view for at least one second on a targeted computing device.

8. The method of claim 1, further comprising storing, by the reporting system, a second unaltered dataset.

9. The method of claim 1, further comprising directing, by the computing device, a fake records server to generate a number of fake records based on the first alteration quantity.

10. The method of claim 9, wherein the fake records server sends fake requests for targeted communications.

11. The method of claim 9, further comprising:

transmitting, by the fake records server, fake beacons; and altering, by the fake records server, viewership data transmitted to the reporting system based on the fake beacons.

12. The method of claim 11, further comprising removing the fake beacon data from the viewership data to generate filtered viewership data.

13. The method of claim 1, further comprising blocking, by the computing device based on predetermined rules, a second query.

14. The method of claim 13, wherein the predetermined rules comprise blocking a query based on frequency of similar queries over a predetermined time period.

15. A computer system comprising a processor device set comprising one or more processor devices coupled to a memory of one or more computing devices, the processor device set to:

receive a query response from a user information system, the user information system including a plurality of user profiles, the query response comprising information associated with a plurality of users and being in reply to a first query requesting user profiles for serving targeted communications;

alter a first dataset of the query response by a first alteration quantity for transmission to a source computing device, the first alteration quantity based on a size of the first dataset in the query response, wherein the first data set is altered by one of changing a data value in the first dataset, removing a data value from the first dataset, or adding a data value to the first dataset;

store query data identifying the first alteration quantity;

receive a report from a reporting system, the reporting system including communications-viewed data from at least some target computing devices associated with corresponding user profiles of the plurality of user profiles, wherein the report indicates a targeted communication was viewed on a targeted computing device;

access the query data to determine the first alteration quantity; and alter a second dataset of the report by a second alteration quantity for transmission to the source computing device, the second alteration quantity based on the first alteration quantity.

16. The computer system of claim 15, wherein altering the first dataset comprises adding noise to obfuscate identities of individuals within the first dataset.

17. The computer system of claim 15, wherein the processor device set is further configured to direct a fake records server to generate a number of fake records based on the first alteration quantity.

18. The computer system of claim 17, wherein the processor device set is further to:

transmit, by the fake records server, fake beacons; and alter, by the fake records server, viewership data transmitted to the reporting system based on the fake beacons.

19. A non-transitory computer-readable storage medium that includes executable instructions configured to cause one or more processor devices to:

receive a query response from a user information system, the user information system including a plurality of user profiles, the query response comprising information associated with a plurality of users and being in reply to a first query requesting user profiles for serving targeted communications;

alter a first dataset of the query response by a first alteration quantity for transmission to a source computing device, the first alteration quantity based on a size of the first dataset in the query response, wherein the first data set is altered by one of changing a data value in the first dataset, removing a data value from the first dataset, or adding a data value to the first dataset;

store query data identifying the first alteration quantity;

receive a report from a reporting system, the reporting system including communications-viewed data from at least some target computing devices associated with corresponding user profiles of the plurality of user profiles, wherein the report indicates a targeted communication was viewed on a targeted computing device;

access the query data to determine the first alteration quantity; and alter a second dataset of the report by a second alteration quantity for transmission to the source computing device, the second alteration quantity based on the first alteration quantity.

* * * * *